United States Patent [19]

Yoshida

[11] 4,153,068

[45] May 8, 1979

[54] PNEUMATIC CONTROLLER

[75] Inventor: Takeshi Yoshida, Musashino, Japan

[73] Assignee: Hokushin Electric Works, Ltd., Tokyo, Japan

[21] Appl. No.: 849,552

[22] Filed: Nov. 8, 1977

[30] Foreign Application Priority Data

Nov. 8, 1976 [JP] Japan .................... 51/133942

[51] Int. Cl.² .................... F15B 5/00; G05D 16/00
[52] U.S. Cl. .................... 137/84; 137/86; 137/DIG. 1
[58] Field of Search ............... 137/86, 85, 84, DIG. 1

[56] References Cited

U.S. PATENT DOCUMENTS

| | | | |
|---|---|---|---|
| 3,572,360 | 7/1969 | Lloyd | 137/86 |
| 3,680,580 | 8/1972 | Beardsley | 137/86 |
| 3,908,085 | 9/1975 | Caldwell | 137/86 |

Primary Examiner—Alan Cohan
Attorney, Agent, or Firm—Hammond & Littell

[57] ABSTRACT

Discloses a pneumatic controller having a proportional band altering unit, a proportional plus integral operation unit, a comparator and a manual-automatic transfer means, wherein the proportional band altering unit is combined with the proportional plus integral operation unit to provide a proportional band altering mechanism which limits input to prevent output of the comparator from being saturated whereby to enable the pneumatic controller to perform the transfer between the manual and automatic modes in a balanceless and bumpless manner.

7 Claims, 6 Drawing Figures

PNEUMATIC CONTROLLER

BACKGROUND OF THE INVENTION

This invention relates generally to pneumatic controllers forming a part of a process control system, and more particularly to an improved controller in which transfer from manual to automatic operation is effected in a "balanceless" and "bumpless" manner.

A pneumatic controller is a component in a process control loop which is subject to disturbances, the controller acting in conjunction with other devices to maintain a process variable at a desired value. To accomplish this purpose, the controller receives, in terms of pneumatic signals, both the set value and the process variable, the controller functioning to operate a final element which directly or indirectly governs the process variable.

Pneumatic controllers ordinarily operate automatically to maintain a process condition at a desired level. But in some situations, it becomes necessary to transfer the controller from automatic to non-automatic or manual operation. Thus it may be desirable to control the process condition by means of a manually-adjustable signal.

Most controllers of recent process control systems are capable of transferring manual operation to automatic operation or vise versa in balanceless and bumpless manner. In a pneumatic controller, however, manual operation may not always be tranferred to automatic operation unconditionally but bumpless transfer can be achieved only when preportional band input deviation and manual input just before the transfer satisfy certain conditions. In other words, whether bumps are produced or not during the transfer depends upon the above-mentioned three parameters and operators could have hardly judged the time of transfer intuitively.

In conventional pneumatic controllers, a transfer from automatic mode to manual mode could always be accomplished in bumpless manner, however, in the case of the transfer from manual operation to automatic operation, it could be accomplished only when deviation is small and proportional band is large in percentage. For example, in the case of a proportional band of 50% and a manual output 40%, bumps have been produced with a deviation larger than 30% in such a conventional controller. Bumps during the manual-automatic operation transfer are caused by saturation of the output of the comparator which serves to compare the manual output with the automatic output and enables the automatic output to follow the manual output.

Generally, in force-balance type pneumatic controllers of the prior art such as shown in Japanese patent application No. 76,709 of 1972 (Japanese open patent application No. 33,095 of 1974) comprising a proportional band altering unit, a proportional plus integral operation unit and a comparator, in order to perform manual-automatic transfer in a balanceless and bumpless mode, the force to be transmitted from the proportional band altering unit to the proportional plus integral operation unit is limited within a certain range so as to prevent the force of a force beam in the proportional plus integral operation unit from becoming unbalanced due to saturation of a comparison output from the comparator in the manual operaton mode.

Pneumatic controllers of such a type require bellows and other additional mechanisms as the balanceless and bumpless manual-automatic transfer mechanisms, thus they are complicated in construction and expensive.

SUMMARY OF THE INVENTION

In view of the foregoing, it is the main object of this invention to provide an improved pneumatic controller which is arranged so as to be capable of operating in both manual and automatic modes and transferring the operation in one mode to the other in balanceless and bumpless manner.

Another object of the present invention is to provide a pneumatic controller which is capable of limiting input to prevent the output of a comparator from being saturated and transferring manual operation to automatic operation in bumpless mode unconditionably.

Also, another object of the present invention is to provide a pneumatic controller which is simple in construction and has a manual-automatic bumpless transfer mechanism.

A further object of the present invention is to provide a highly accurate pneumatic control unit of which construction is simplified to reduce the number of mechanical friction elements to the minimum.

OUTLINE OF THE DRAWING

For a better understanding of the invention as well as other objects and further features thereof, reference is made to the following detailed description to be read in conjunction with the accompanying drawing, wherein.

DESCRIPTION OF THE INVENTION

Figure 1:
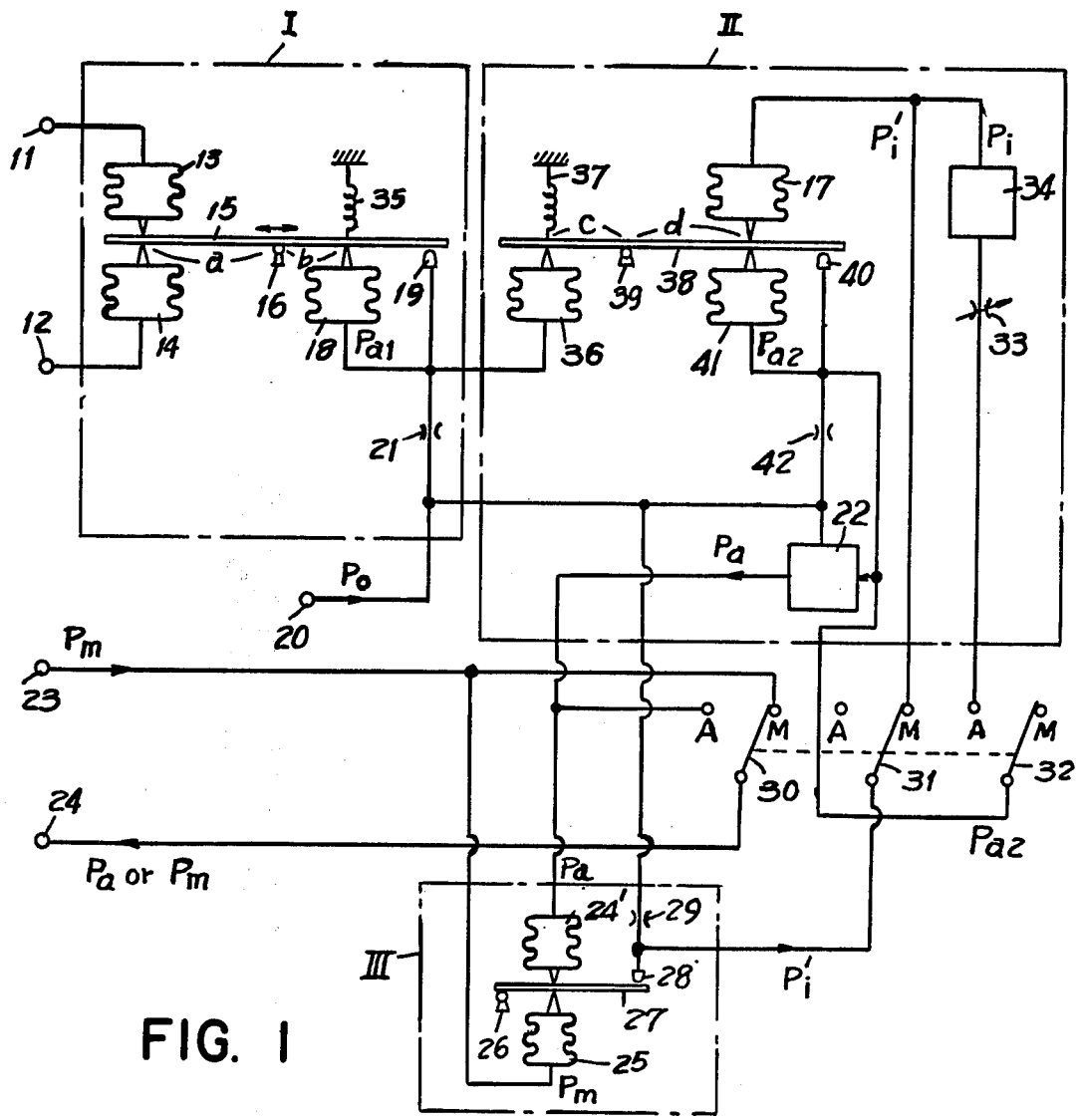
FIG. 1 is a block diagram showing a typical construction of a conventional pneumatic controller having a manual-automatic balanceless and bumpless transfer mechanism.

Referring now to FIG. 1, which is a block diagram showing an example of the force-balance type pneumatic controller having a conventional manual-automatic balanceless and bumpless transfer mechanism as disclosed in the applicant's Japanese patent application No. 76,709 of 1972 (Japanese open patent application No. 33095 of 1974) entitled "Pneumatic Controller."

Block I in chain lines is a proportional band altering or changing unit. In the proportional band altering unit I, a set pressure $P_S$ and a measured pressure $P_V$ led respectively to input terminals 11 and 12 are applied respectively to a set bellows 13 and a measurement bellows 14 oppositely disposed relative to one end of a force beam 15, at a distance (a) from a movable fulcrum 16 of the force beam 15 which inclines about the movable fulcrum 16. On the other side of the bellows 13 and 14, a first proportional bellows 18 and a spring 35 are oppositely arranged relative to the force beam 15 at a distance (b) from the movable fulcrum 16 and a nozzle 19 of which flapper is the force beam, is provided at the other end of the force beam 15. An air pressure $P_O$ is applied to the nozzle 19 from an air feeder terminal 20 through a throttle 21 and a back pressure $P_{a1}$ of the nozzle 19 is applied to the first proportional bellows 18.

Block II is a proportional plus integral operation unit. In the proportional plus integral operation unit II, an input bellows 36 and a spring 37 are oppositely arranged relative to one end of a force beam 38 at a distance (c) from a fulcrum 39 of the force beam 38 which inclines about the fulcrum, and relative to the force beam on the other side of the bellows 36 and springs 37, an integral bellows 17 and a second proportional bellows 41 are oppositely disposed and a nozzle 40 of which flapper is the force beam 38, is provided at the other end of the force beam 38. The nozzle 40 is supplied with air pressure $P_O$ from the air feeder terminal 20 through a throttle 42 and back pressure $P_{a2}$ of the nozzle 40 is applied to the second proportional bellows 41 and also to the input end of a relay valve 22 which is actuated by the air pressure $P_O$. The input bellows 36 is applied with the nozzle back pressure $P_{a1}$ of the nozzle 19 in the proportional band altering unit I. The integral bellows 17 is connected to a manual side terminal M of a switch 31 which will be described hereinafter, and to an automatic side terminal A of a switch 32 which will also be described hereinlater, through an integral capacity 34 and an integral throttle 33.

Block III in FIG. 1 is a comparator. In this comparator III, relative to a flapper 27 which inclines about a fulcrum 26 situated at one end of the flapper, a bellows 24' which is applied with an automatic output pressure $P_a$ from the relay valve 22 and a bellows 25 which is applied with a manual output pressure $P_m$ from a feed terminal 23, are oppositely located and a nozzle 28 is located at the other end of the flapper. The nozzle 28 is supplied with the air pressure $P_O$ from the feed terminal 20 through a throttle 29.

Switch 30 is an automatic-manual transfer switch which is interlocked with other switches 31 and 32. An automatic side terminal A of the transfer switch 30 is applied with automatic output pressure $P_a$ from the relay valve 22, whereas its manual side terminal M is applied with manual output pressure $P_m$ from the terminal 23 and the transfer terminal is connected to an output terminal 24 of the pneumatic controller. The automatic side terminal A of the switch 31 is remained unconnected and closed and the transfer terminal thereof is applied with a back pressure of the nozzle 28 (i.e., comparison output of the comparator III). The manual side terminal M of the switch 32 is also remained unconnected and closed and the transfer terminal thereof is applied with a back pressure of the nozzle 40.

The pneumatic controller is provided with a manual-automatic balanceless and bumpless transfer mechanism comprising bellows 18 and 36, nozzle 19, throttle 21 and springs 35 and 37 in order to prevent the balanceless and bumpless transfer of the manual mode to the automatic mode from becoming impossible due to saturation of comparison output $P_i'$ of the comparator III during the manual mode which causes loss in force balance at the force beam 38 consequently the condition of $P_a = P_m$ is not fulfilled. The transfer mechanism serves to limit the force to be transmitted to the proportional plus integral operation unit II from the proportional band altering unit I, within a certain range. In other words, the force to be transmitted to the proportional plus integral operation unit II is limited within a certain range by saturation of the back pressure of the nozzle 19.

This force range remains constant and irrelevant to deviations of the set pressure $P_s$ and the measured pressure $P_V$ and also to the proportional band b/a X 100%. Thus, in this pneumatic controller, distances (c) and (d) in the force beam 38 are selected so as to keep forces in balance in the force beam 38 within a range without saturating the comparison output $P_i$ regardless of deviations of the set pressure $P_s$ and the measured pressure $P_v$, the proportional band b/a X 100% and the manual output pressure $P_m$ in the manual operation mode.

The pneumatic controller of the prior art, however, has disadvantages in that its manual-automatic balanceless and bumpless transfer mechanism requires such elements as bellows 18 and 36, nozzle 19, throttle 21 and springs 35 and 37 and that the transfer mechanism is complicated and expensive.

As set forth hereinbefore, the object of the present invention is to provide an improved pneumatic controller having a manual-automatic balanceless and bumpless transfer mechanism which is simple in construction.

Figure 2:
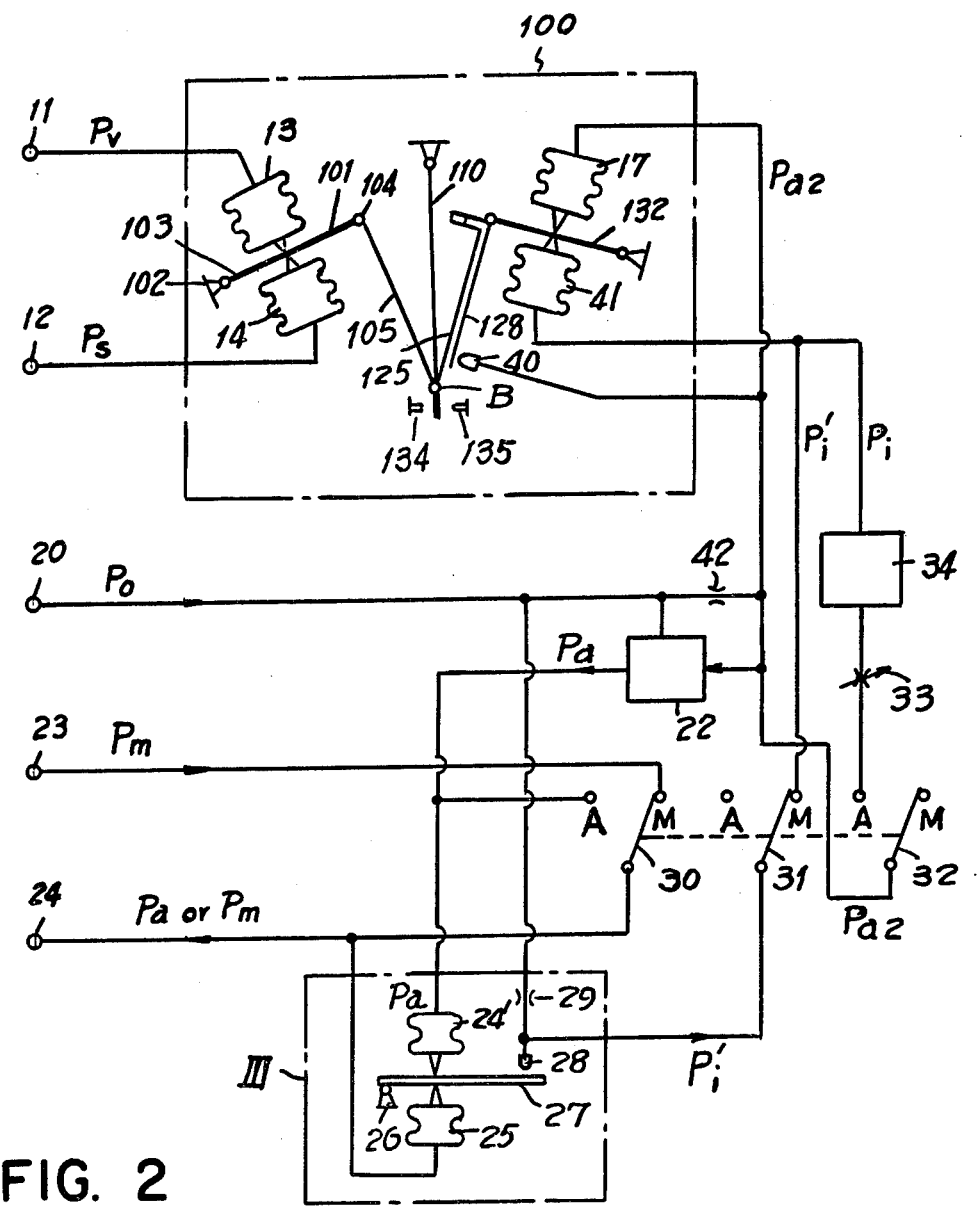
FIG. 2 is a block diagram showing an example of a pneumatic controller of the present invention having a manual-automatic balanceless and bumpless transfer mechanism.

FIG. 2 is a block diagram of a preferred embodiment of the pneumatic controller provided with a manual-automatic balanceless and bumpless transfer mechanism according to the present invention. In FIG. 2, similar elements to the elements shown in FIG. 1 are designated by the same reference numerals. Block 100 is a proportional band altering mechanism which is provided by functionally integrating the proportional band altering unit I and the proportional plus integral operation unit II of the conventional pneumatic controller shown in FIG. 1.

Figure 3:
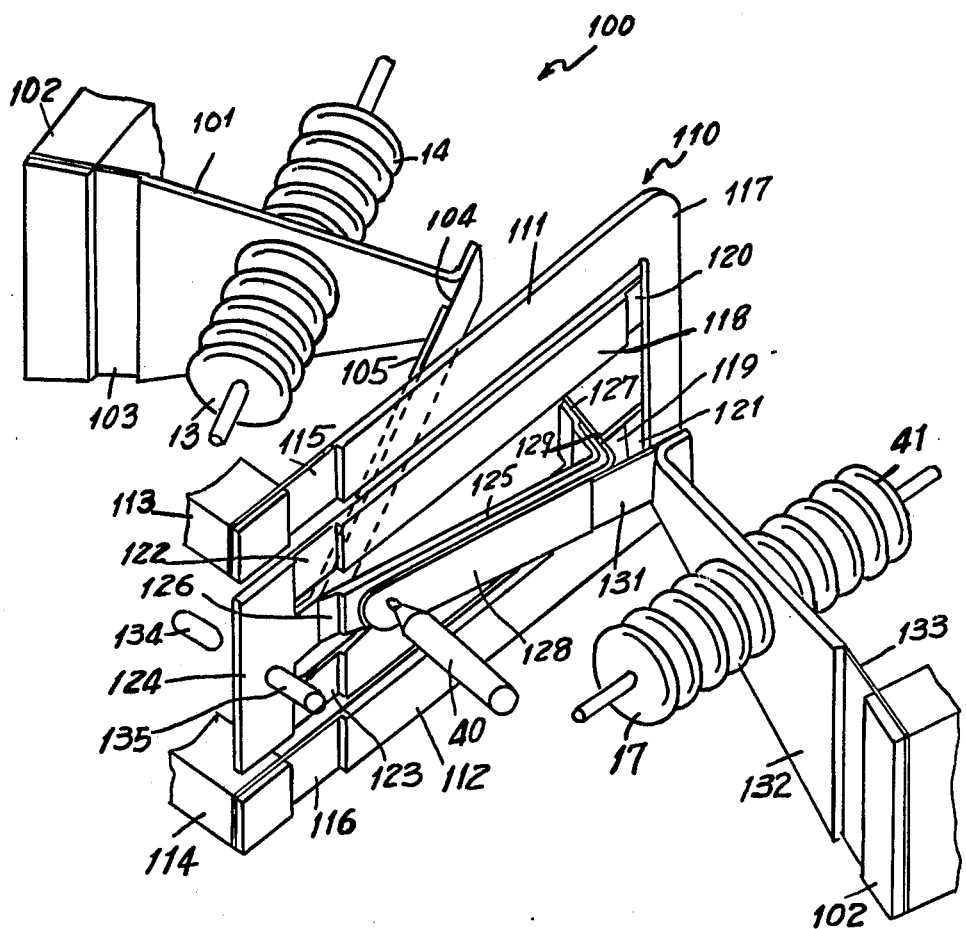
FIG. 3 is a perspective view of a preferred embodiment of the proportional band altering mechanism in the controller of the present invention.

Referring to FIG. 3, the proportional band altering mechanism 100 of the present invention comprises an input beam 101 one end of which is connected to the wall of a casing 102 through a flexure 103, while the other end of the input beam 101 is connected to one end of an input link 105 through a flexure 104. The input beam 101 is applied with a set pressure $P_s$ and a measured pressure $P_v$ respectively from a set bellows 13 and a measurement bellows 14 oppositely arranged to the beam 101.

A proportional band changing lever 110 includes two outer elements 111 and 112 which are respectively connected through flexures 115 and 116 to posts 113 and 114 so as to be pivotally movable about the posts in substantially frictionless manner within a limited motion range. The remote ends of the outer elements 111 and 112 are rigidly mounted to a head piece 117 so as to form an integral yoke of generally U-shape.

One end of each of two balance levers 118 and 119 is connected to the head piece 117 through flexures 120 and 121 while the other ends thereof are connected to the end of an end plate 124 through flexures 122 and 123. Also the other end of the input link 105 is rigidly secured to the end plate 124.

A feedback link 125 of generally L-shaped is disposed between the balance levers 118 and 119 and the end of the long arm of the link 125 is connected to the end of the end plate 124 through a flexure 126. The outermost end of the short arm 127 of the L-shaped feedback link 125 is secured to the short arm 129 of an L-shaped flapper 128 made of an elastic material having a desired spring constant so as to form a gap between the short arms 127 and 129, one end of the flapper 128 being the free end and adjacent to which a nozzle 40 is positioned.

Preferably the spring constant of the flapper 128 is selected so that the displacement of the free end of the flapper arranged adjacent to the nozzle will be approximately 0.2 mm at 100% change (span in change of pneumatic signal, 0.3 kg f/cm$^2$) of the integral bellows 17.

The other end of the flapper 128 is connected to one end of a feedback beam 132 through a flexure 131, while the other end of the flapper is connected to the wall of the casing 102 through a flexure 133. The feedback beam 132 is applied with feedback forces $F_{FB}$ from an integral bellows 17 and a proportional bellows 41 which are arranged oppositely on both sides of the beam.

The end plate 124 is provided with a pair of stoppers 134 and 135 mounted respectively to both sides of the plate. These stoppers serve to limit the displacement of the ends of the balance levers 118 and 119 caused by a deviation input applied to the input link 105, within a certain range.

Descriptions of the air circuit connected to the integral bellows 17, the proportional bellows 41 and the nozzle 40 of the proportional band altering mechanism and the air circuit associated with the comparator III and the switches 30, 31 and 32 are omitted because the circuits are similar to that described with reference to FIG. 1.

Now the performance of the proportional band altering mechanism will be described with reference to FIG. 4. The input link 105 is applied with a force $F_{IN}$ from the set bellows 13 and the measuring bellows 14. A feedback force $F_{FB}$ is applied to the flapper 131 from the integral bellows 17 and the proportional bellows 41.

Figure 4:
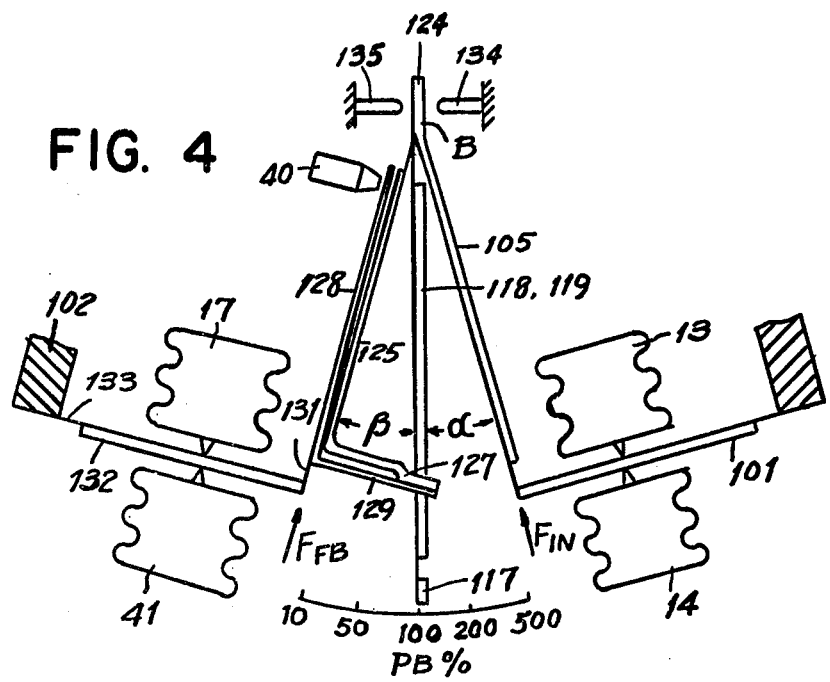
FIG. 4 is a schematic diagram illustrating the performance of the proportional band altering mechanism shown in FIG. 3.

If the measured force has increased, since the force $F_{IN}$ longitudinally applied to the input link would also have increased, the balance levers 118 and 119 would be turned about a point B to the left as seen in FIG. 4, thus the feedback link 125 would come nearer to the nozzle 40 so as to increase the nozzle back pressure. Since increase in nozzle back pressure causes increase in pressure of the proportional bellows 41 and thus increase in force $F_{IN}$ applied longitudinally to the feedback beam 132, the balance levers 118 and 119 would be turned to the right as seen in the drawing and remain in a balanced state. In the balanced state, the equilibrium of the forces applied to the balance levers gives an equation of $F_{IN} \sin \alpha = F_{FB} \sin \beta$.

Since the proportional band is proportional to the ratio of input force $F_{IN}$ to feedback force $F_{FB}$, i.e., to $F_{IN}/F_{FB}=\sin\beta/\sin \alpha$, the proportional band may be changed by turning the head piece 117 to either direction as shown by arrow C so as to change the angles $\alpha$ and $\beta$ formed by the balance levers 118 and 119, the input link 105 and the feedback link 125.

Figure 5:
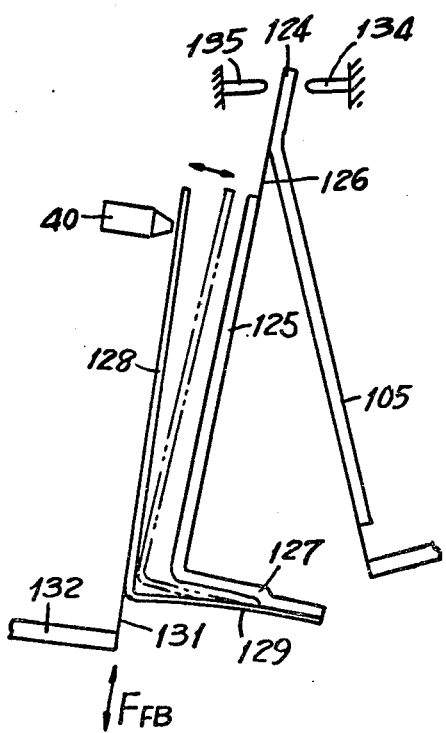
FIG. 5 is a schematic diagram showing the working relationship between a feedback link and a flapper in the proportional band altering mechanism shown in FIG. 3.

Lateral displacement of the point B of the input link, i.e., of the end plate 124 is limited by the stoppers 134 and 135 and the feedback force $F_{FB}$ is applied to the feedback link 125 while displacing the flapper 125 in accordance with its spring constant, as shown in FIG. 5. The flapper 128 is arranged so as to be bent in the direction giving a negative feedback loop by which the space between the flapper 128 and the nozzle 40 is maintained constantly.

In the case of a perfect force beam type in which the flapper is not bent at all, the force application point B is not substantially displaced by the input and feedback forces, however, in the case of a system such as the system of the present invention which is not a perfect force balance type but is a force balance plus displacement balance type, the displacement of the point B increases by an amount required to nullify the deflection of the flapper 128.

The stoppers 134 and 135 serve to limit the displacement of the point B within a certain range when the deviation input from the set and measurement bellows 13 and 14 is excessive. The input link 105, particularly the end plate 124 connected to the input link 105, lies in the middle in-between the stoppers in the normal state without any input deviation, however, it will come in contact with either stopper 134 or 135 when the input is excessive.

As described hereinbefore, since the proportional band changing mechanism of the present invention is not of the perfect force balance type, the movement of the force application point B relative to an input within a normal range is relatively larger than that in the case of the perfect force balance type. Therefore, the space between the stoppers 134 and 135 may be widened so that restrictions on the working accuracy may be relaxed.

In the state in which an excess force has been applied to the input link 105, consequently the end plate 124 has come in contact with either of the stoppers 134 and 135, since the flapper 131 may be bent as shown in FIG. 5, a closed loop may be provided in the controller by slightly bending the flapper with a feedback force.

In other words, when the input deviation is excessive and thus even after the force applied to the point B through the input link has been limited by the stoppers 134 and 135 the feedback loop comprising the proportional bellows 41, the flapper 131 and the nozzle 40 is still working and for example, the back pressure of the nozzle 40 rises with the rise of pressure of the integral bellows 17.

Thus if the spring constant of the flapper 131, the space between the stoppers 134 and 135, etc., are substantially selected, the automatic input may be rendered to follow the manual input by a loop comprising the integral bellows 17, the proportional bellows 41, the nozzle 40, the relay valve 22 and the comparator III, in the manual mode regardless of input deviation, manual output pressure $P_m$ and proportional band without causing the comparator to be saturated. Therefore, the state of $P_a=P_m$ which is the essential requirement of the manual-automatic balanceless and bumpless transfer may be accomplished under any conditions.

Figure 6:
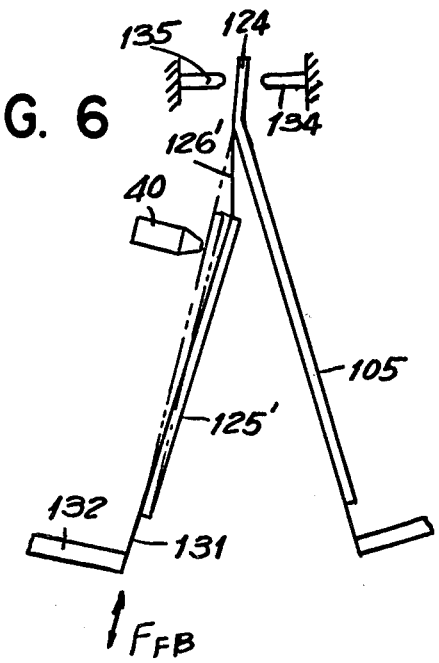
FIG. 6 is a schematic view of a modification of the feedback link.

In the embodiment shown in FIG. 3, the L-shaped feedback link 125 is used and one end 129 of the L-shaped elastic flapper 128 is connected to one end 127 of the feedback link 125 so as to displace the link. FIG. 6 shows a modification of this part. In the modification, in place of the L-shaped feedback link, a plate member 125' which serves as the flapper of the nozzle 40 is used and a flexure 126' for connecting the plate member 125' to the end plate 124 is slightly angled inwardly as shown in FIG. 6 so as to bend the feedback plate member 125' in the normal direction relative to the feedback force $F_{FB}$.

It is to be understood that the foregoing description illustrates the invention and specific embodiments thereof, and that many changes and modifications may be made by those skilled in the art without, however, departing from the essential spirit of the invention.

I claim:

1. A pneumatic controller comprising:
(a) a proportional band changing mechanism including:

an input link adapted to receive a deviation input of a set value and a measured value, a feedback link adapted to receive a feedback force, means for connecting said input link to said feedback link, a proportional band changing lever connected to a connecting point of said input link and said feedback link and pivotally supported in-between said links, a flapper means adapted to be displaced by the force applied to said feedback link, and means for limiting the displacement of a portion of said connecting means within a certain range when an excess deviation force is applied to said input link;

(b) an air injection nozzle cooperating with said flapper;

(c) means for applying a feedback force to said feedback link in response to the back pressure from said nozzle;

(d) means for producing an automatic output pressure in response to a back pressure from said nozzle;

(e) means for transferring said automatic output pressure to a manual output pressure; and (f) a comparator for comparing said automatic output pressure with said manual output pressure and transmitting an output corresponding to a difference between said pressures to said proportional band changing mechanism through said transfer means in the manual mode.

2. A pneumatic controller as set forth in claim 1, wherein said means for connecting said input link to said feedback link is a floating pivot.

3. In a pneumatic controller as set forth in claim 1, wherein said proportional band changing mechanism further includes:
(a) a pivoted force beam;
(b) a first bellows for applying a force proportional to an input representing a set value to said force beam;
(c) a second bellows disposed opposite to said first bellows so as to apply a force proportional to an input representing a measured value to said force beam;
(d) a second pivoted force beam; and
(e) an integral bellows and a proportional bellows arranged oppositely for applying a force to said second force beam.

4. A pneumatic controller set forth in claim 3, wherein means for connecting said first force beam to said input link and means for connecting said second force beam to said feedback link are in the form of a floating pivot.

5. A pneumatic controller as set forth in claim 3, wherein said means for connecting said second force beam to said feedback link is an elastic member having a predetermined spring constant, a portion of said elastic member serving as a flapper of said air injection nozzle.

6. A pneumatic controller as set forth in claim 3, wherein said flapper connecting said second force beam to said feedback link is a plate member, said plate member being adapted to be deflected in the normal direction relative to a feedback force applied thereto.

7. A pneumatic controller as set forth in claim 1, wherein the limit range in said means for limiting the displacement of said connecting means is a range within which said comparator remains unsaturated.

* * * * *